United States Patent
Dinh (10) Patent No.: US 7,214,878 B2
(45) Date of Patent: May 8, 2007

(54) WALL PLATE ASSEMBLY

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/206,317

(22) Filed: Aug. 17, 2005

(65) Prior Publication Data

US 2006/0037774 A1    Feb. 23, 2006

Related U.S. Application Data

(63) Continuation-in-part of application No. 29/211,493, filed on Aug. 17, 2004.

(60) Provisional application No. 60/602,217, filed on Aug. 17, 2004.

(51) Int. Cl.
*H02G 3/14* (2006.01)

(52) U.S. Cl. .................. 174/66; 174/67; 174/53; 220/241; 220/242; 248/906

(58) Field of Classification Search .............. 174/50, 174/53, 57, 58, 66, 67, 48, 17 CT, 59, 481, 174/480; 220/3.2, 3.3, 3.4, 3.5, 3.6, 3.7, 220/3.8, 3.9, 4.02, 241, 242; 248/906; D13/156; 439/536, 537, 535, 538, 539, 135, 195, 139
See application file for complete search history.

(56) References Cited

U.S. PATENT DOCUMENTS

| | | | |
|---|---|---|---|
| 691,874 A | 1/1902 | Robinson | |
| 1,694,054 A * | 12/1928 | Both | 174/66 |
| 2,828,394 A | 3/1958 | Mayzik | |
| D214,449 S | 6/1969 | Greene | |
| 3,530,230 A * | 9/1970 | Cormier et al. | 174/66 |
| 3,864,511 A | 2/1975 | Morby et al. | |
| 4,059,327 A | 11/1977 | Vann | |
| 4,451,108 A | 5/1984 | Skidmore | |
| 4,559,410 A | 12/1985 | Hostetter | |
| 4,603,229 A | 7/1986 | Menchetti | |
| 4,613,728 A | 9/1986 | Lathrop | |
| 4,642,418 A | 2/1987 | Menchetti | |
| 4,721,476 A | 1/1988 | Zeliff et al. | |
| 4,758,687 A | 7/1988 | Lathrop | |
| 4,778,399 A | 10/1988 | Schenk | |
| D308,464 S | 6/1990 | Freeman et al. | |
| 4,972,045 A * | 11/1990 | Primeau | 174/66 |
| 4,988,832 A | 1/1991 | Shotey | |

(Continued)

OTHER PUBLICATIONS

U.S. Appl. No. 29/205,607, filed May 18, 2004, Dinh, USPTO Filing Receipt, specification and drawings.

(Continued)

*Primary Examiner*—Angel R. Estrada
(74) *Attorney, Agent, or Firm*—Hoffmann & Baron, LLP (57) ABSTRACT

A wall plate assembly includes a front faceplate having two lateral openings. A rear faceplate is connected to the front faceplate such that the rear faceplate is recessed from the front faceplate and access to the rear faceplate is provided through one of the lateral openings. The rear faceplate has a low voltage port. A clamp is connected to a rear surface of the front or rear faceplates for securing the front faceplate to a wall structure.

2 Claims, 11 Drawing Sheets

U.S. PATENT DOCUMENTS

| | | |
|---|---|---|
| 5,114,365 A | 5/1992 | Thompson et al. |
| 5,117,122 A | 5/1992 | Hogarth et al. |
| 5,243,134 A | 9/1993 | Nattel |
| 5,257,946 A | 11/1993 | MacMillan et al. |
| D343,825 S | 2/1994 | Enderby |
| D348,870 S | 7/1994 | Warrington |
| 5,419,716 A | 5/1995 | Sciammarella et al. |
| 5,486,650 A | 1/1996 | Yetter |
| 5,574,256 A | 11/1996 | Cottone |
| 5,598,998 A | 2/1997 | Lynn |
| 5,651,696 A * | 7/1997 | Jennison ............... 174/66 |
| 5,934,917 A | 8/1999 | Haut |
| 6,026,605 A * | 2/2000 | Tippett ............... 174/66 |
| 6,093,890 A | 7/2000 | Gretz |
| 6,102,360 A | 8/2000 | Clegg et al. |
| 6,127,630 A | 10/2000 | McKenzie et al. |
| 6,147,304 A | 11/2000 | Doherty |
| 6,194,657 B1 | 2/2001 | Gretz |
| 6,200,159 B1 | 3/2001 | Chou |
| 6,207,895 B1 | 3/2001 | Engel |
| 6,222,124 B1 | 4/2001 | Pritchard et al. |
| 6,323,424 B1 | 11/2001 | He |
| 6,346,674 B1 | 2/2002 | Gretz |
| 6,414,906 B1 | 7/2002 | Gaspari |
| 6,422,781 B1 * | 7/2002 | Ofcharsky et al. ............ 174/59 |
| D462,939 S * | 9/2002 | Dinh ................ D13/156 |
| D463,376 S | 9/2002 | Roesch et al. |
| 6,444,906 B1 | 9/2002 | Lewis |
| D463,969 S | 10/2002 | Luu |
| D467,229 S | 12/2002 | Heggem |
| 6,566,602 B1 | 5/2003 | Miller et al. |
| D478,553 S | 8/2003 | Heggem |
| 6,637,166 B2 | 10/2003 | Kinsey |
| D495,301 S | 8/2004 | Newell |
| 6,872,887 B2 * | 3/2005 | Shotey et al. ............ 174/66 |
| 6,932,624 B1 * | 8/2005 | Hoopes et al. ............ 174/53 |
| 2003/0024927 A1 | 2/2003 | MacDonald |
| 2003/0178421 A1 | 9/2003 | Almond |
| 2004/0123996 A1 | 7/2004 | Lalancette et al. |
| 2004/0238197 A1 | 12/2004 | Gates, II |
| 2005/0072778 A1 | 4/2005 | Hull et al. |
| 2005/0183873 A1 | 8/2005 | Gottardo et al. |

OTHER PUBLICATIONS

U.S. Appl. No. 11/131,597, filed May 18, 2005, Dinh, USPTO Filing Receipt, specification and drawings.

* cited by examiner

WALL PLATE ASSEMBLY

CROSS-REFERENCE TO RELATED APPLICATIONS

This patent application claims priority to and the benefit of U.S. Provisional Application No. 60/602,217 filed on Aug. 17, 2004, entitled "Wall Plate Assembly", the entire disclosure of which is hereby incorporated by reference herein. This patent application is a continuation-in-part of U.S. Design application Ser. No. 29/211,493 filed on Aug. 17, 2004, entitled "Wall Plate Assembly", the entire disclosure of which is hereby incorporated by reference herein.

BACKGROUND OF THE INVENTION

The present invention relates generally to a wall plate assembly for mounting one or more electrical power outlets and low voltage connectors on wall structures, and more particularly, to such a wall plate assembly in which the low voltage connectors are recessed from the wall structure.

Wall plates provide support to electrical power outlets which have receptacles into which are inserted the prongs of an electrical plug for supplying electrical power to a conductor which is connected to the plug. The electrical power outlet may be secured to the wall plate which, in turn, is secured to the wall structure within an opening therein so that the power outlet extends into the region behind the wall structure and the receptacles of the power outlet are accessible from the region in front of the wall structure.

Wall plates may also provide support to low voltage connectors which provide junctions for the conductors of low voltage devices, such as telephones and other communication equipment. Such other communication equipment may be used for connecting a computer to the internet or a local area network (LAN). Such wall plates may locate the low voltage connectors in the same plane as the front surface of the wall structure thereby exposing the connectors and the plugs inserted therein to contact from persons, furniture or other objects which may move in close proximity to the connectors. Such contact may be undesirable by urging the plugs to become dislodged from the low voltage connectors or by exceeding the structural strength of the plugs or connectors.

Wall plates may provide support for electrical power outlets without providing support for low voltage connectors. Also, wall plates may provide support for low voltage connectors without providing support for electrical power outlets. Both of such wall plates may be required to provide the connections needed by devices which require electrical power and low voltage connections. Such devices may include a combined telephone and answering machine, or a personal computer. Such separate wall plates typically require redundant structures and often require separate openings in the wall structure in which the wall plates are supported. Also, such separate wall plates may be located apart from one another by a significant distance. This distance may cause inconvenience for a device which requires connection to a power outlet and a low voltage connector since locating such a device in close proximity to both of such separate wall plates may be difficult.

Wall plates may be secured directly to the flat surface of a wall structure, such as the wallboard, adjacent to the opening therein in which the front of the electrical power outlet is located. Securing a wall plate, to which the power outlet is supported, directly to the wallboard may require specialized attachments, as compared to securing such a wall plate or the power outlet to a wall stud. A wall plate which may be secured directly to a wallboard is especially advantageous in retrofit applications where the wallboard has been secured to the wall studs and access to the studs is thereby typically limited.

SUMMARY OF THE INVENTION

The wall plate assembly of the present invention includes a front faceplate having two lateral openings. A rear faceplate is connected to the front faceplate such that the rear faceplate is recessed from the front faceplate and access to the rear faceplate is provided through one of the lateral openings. The rear faceplate has a low voltage port. A clamp is connected to a rear surface of the front or rear faceplates for securing the front faceplate to a wall structure.

An electrical power outlet may be secured to the front faceplate such that the receptacles of the power outlet are contained in the other lateral opening. The forward ends of the receptacles of the power outlet are contained in the plane of the front faceplate and the power outlet is located to the rear thereof. A low voltage connector may be secured to the low voltage port in the rear faceplate.

The clamps enable the front faceplate to be secured to the wallboard of a wall structure such that the power outlet extends into the region behind the wallboard and the receptacles of the power outlet are accessible from the region in front of the wallboard. The rear faceplate and the low voltage connector secured thereto also extend into the region behind the wallboard. The other lateral opening in the front faceplate provides access to the low voltage connector from the region in front of the wallboard. The clamps provide for the wall plate assembly to be secured directly to the wallboard.

The incorporation of the electrical power outlet and low voltage connector into the wall plate assembly provides a single site for connections to the power outlet and low voltage connector. This provides advantages for a device which requires electrical power and low voltage connections since such a device may be located in close proximity to both the electrical power outlet and low voltage connector supported by the wall plate assembly. Also, the incorporation of the electrical power outlet and low voltage connector into the wall plate assembly requires only a single opening in the wall structure for the location of both the power outlet and low voltage connector.

The extension of the rear faceplate and low voltage connector secured thereto into the region behind the wallboard reduces the exposure of the low voltage connector to contact from persons, furniture or other objects. This provides added protection to the connector and to the plug which may be secured thereto.

These and other features of the invention will be more fully understood from the following description of specific embodiments of the invention taken together with the accompanying drawings.

BRIEF DESCRIPTION OF THE DRAWINGS

In the drawings.

Corresponding reference characters indicate corresponding parts throughout the several views of the drawings.

DETAILED DESCRIPTION OF THE INVENTION

Referring to the drawings and more particularly to FIGS. 1 to 11, a wall plate assembly 10 is shown for mounting to a wall structure 12, such as the vertical wall board of an interior wall of a building structure.

Figure 1:
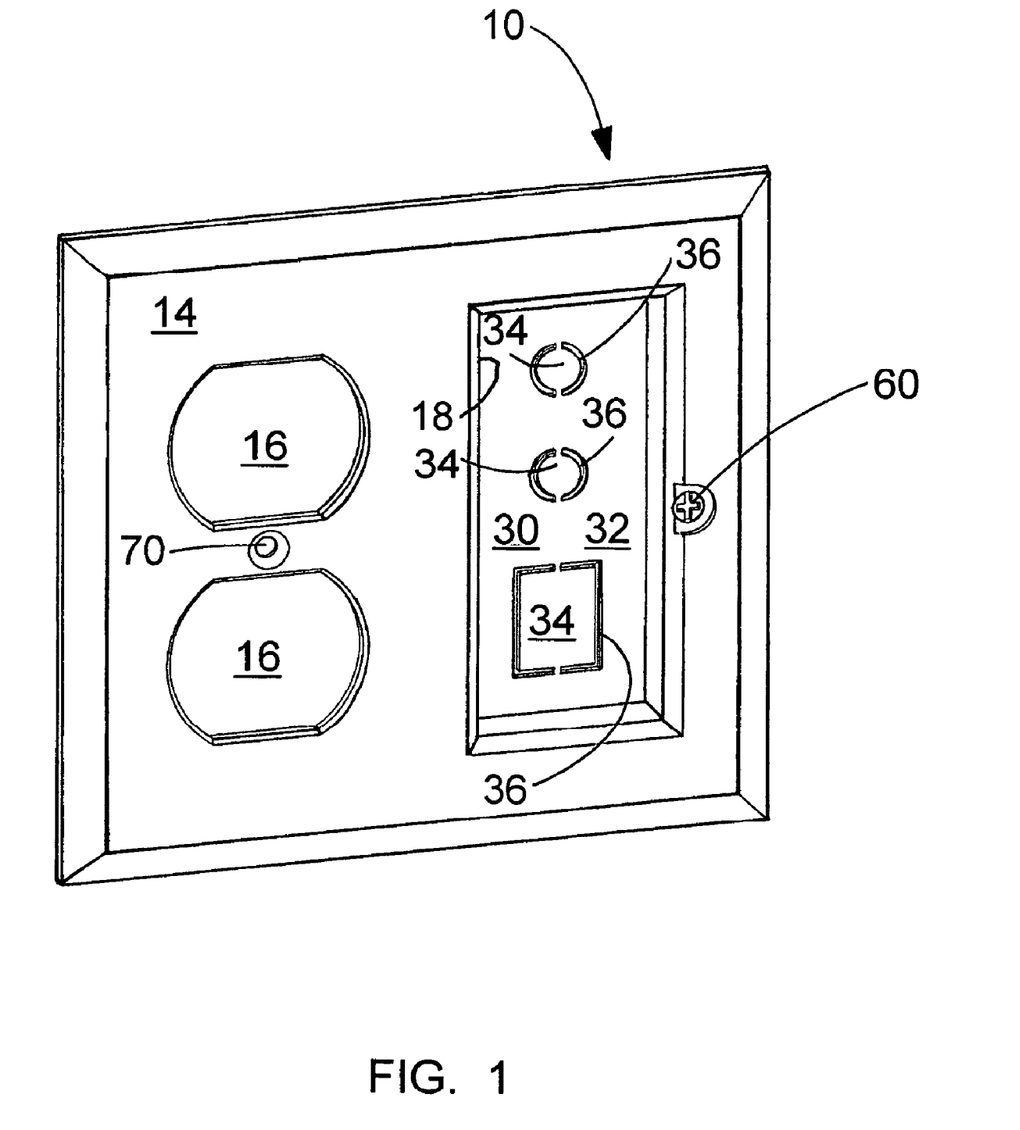
FIG. 1 is a front perspective view of the wall plate assembly of the present invention before assembly of the electrical power outlet thereto and removal of the knockouts from the rear faceplate.
Figure 2:
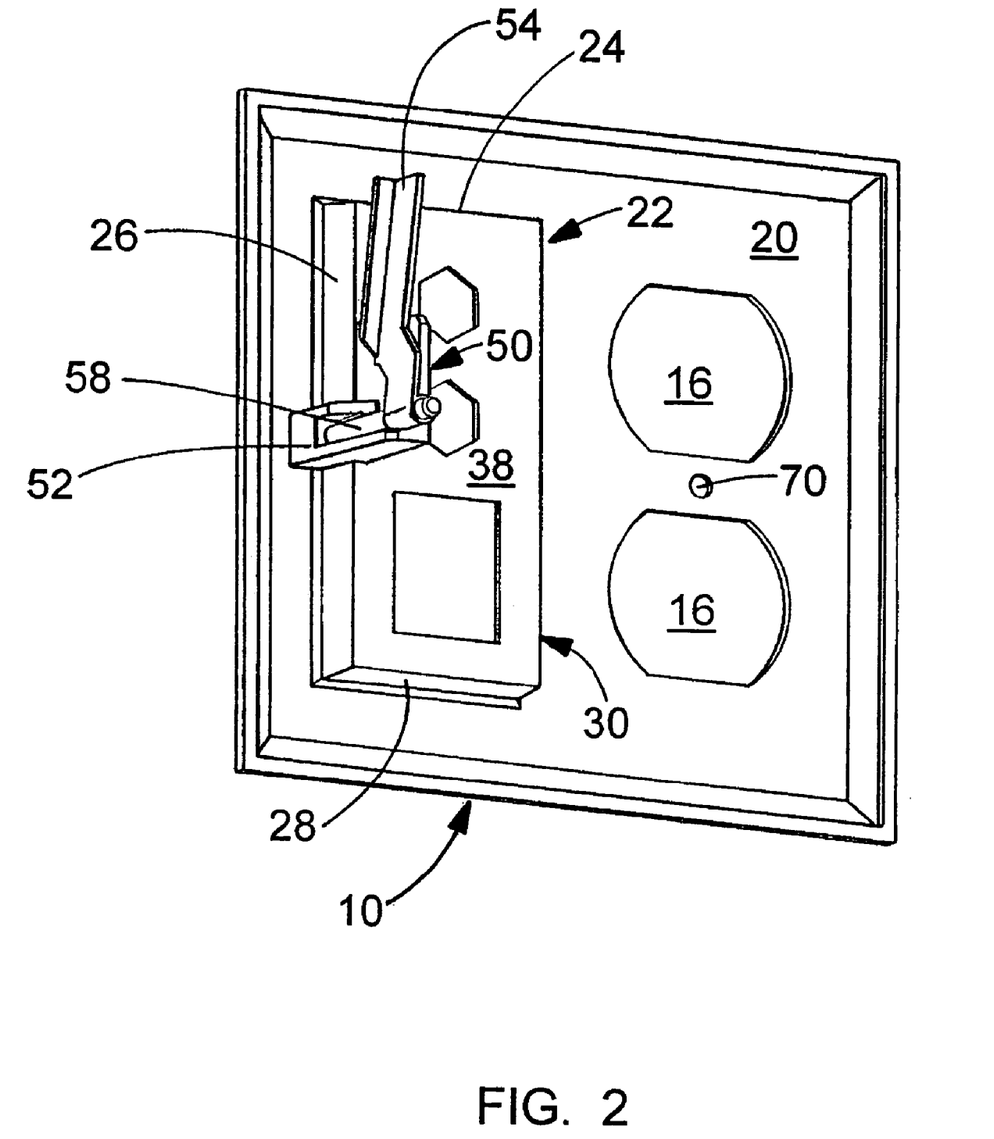
FIG. 2 is a rear perspective view of the wall plate assembly of FIG. 1.
Figure 3:
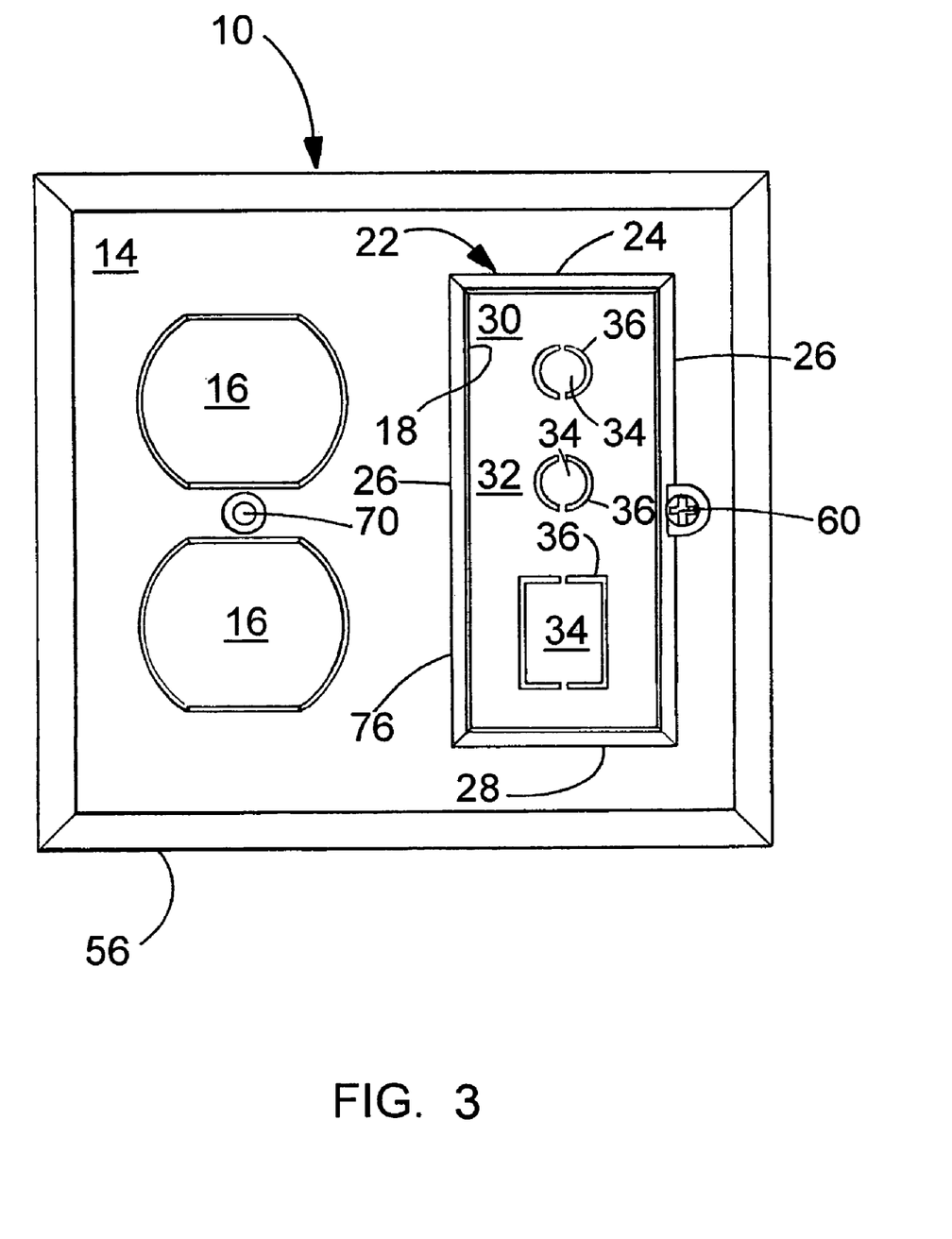
FIG. 3 is a front elevation view of the wall plate assembly of FIG. 1.
Figure 4:
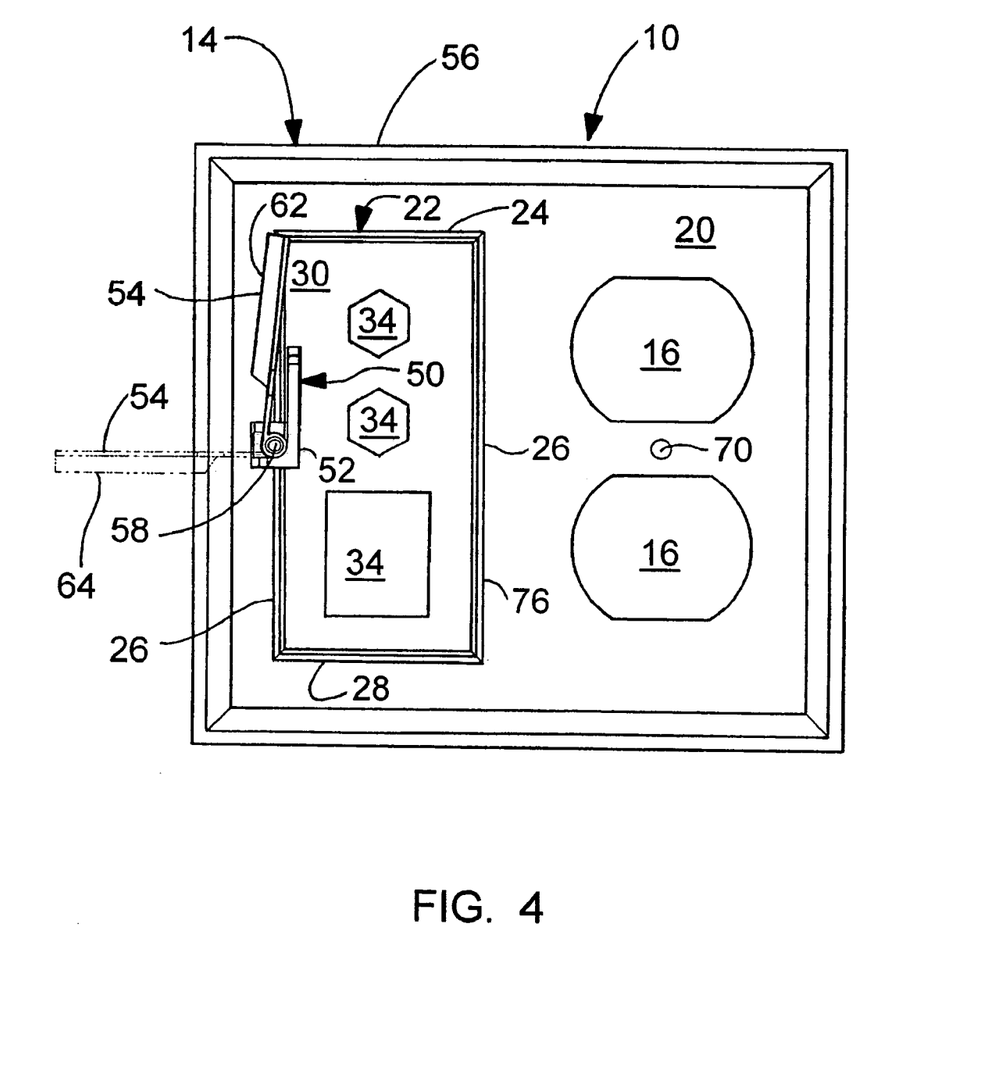
FIG. 4 is a rear elevation view of the wall plate assembly of FIG. 1 showing the arm in the retracted position, in solid lines, and secured position, in phantom.
Figure 5:
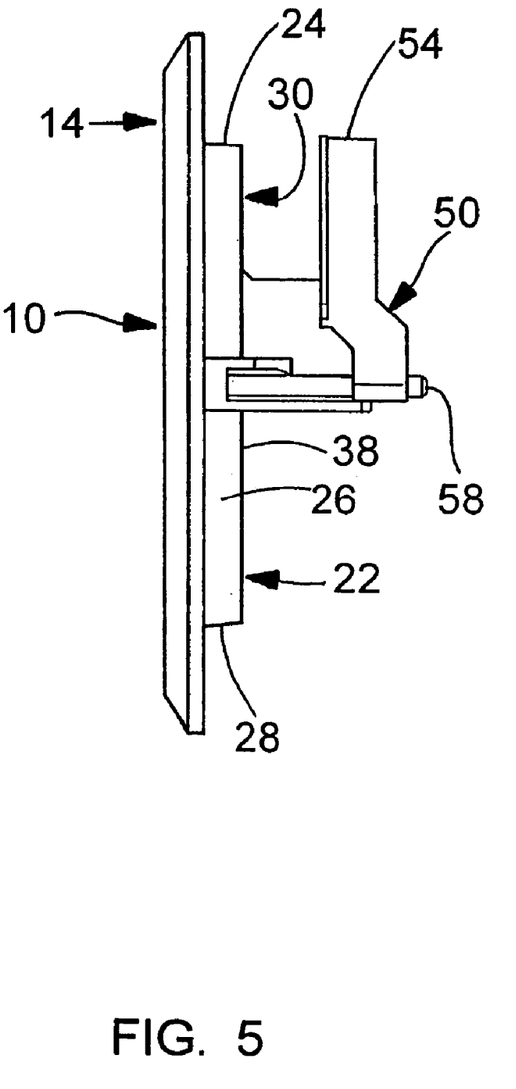
FIG. 5 is a right side elevation view of the wall plate assembly of FIG. 1.
Figure 6:
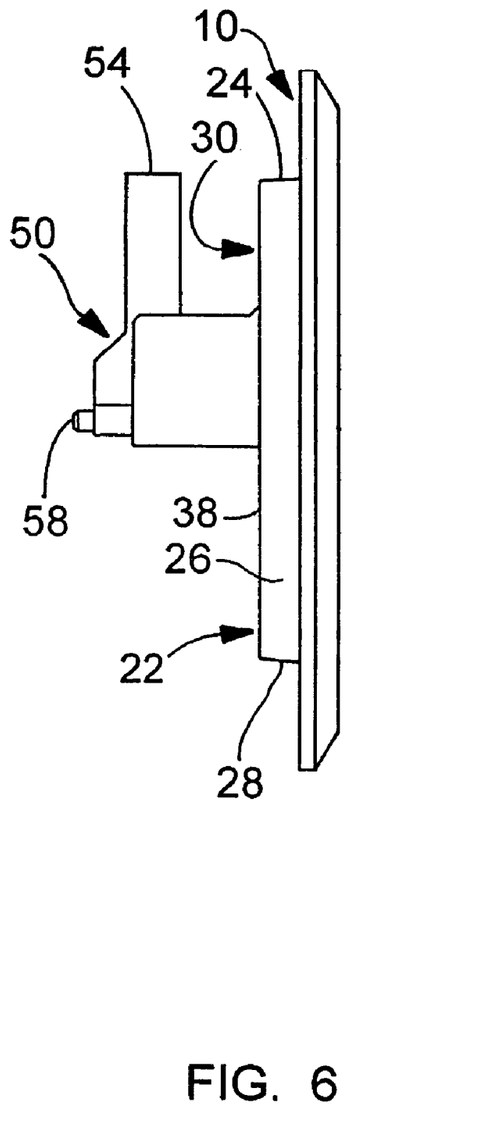
FIG. 6 is a left side elevation view of the wall plate assembly of FIG. 1.
Figure 7:
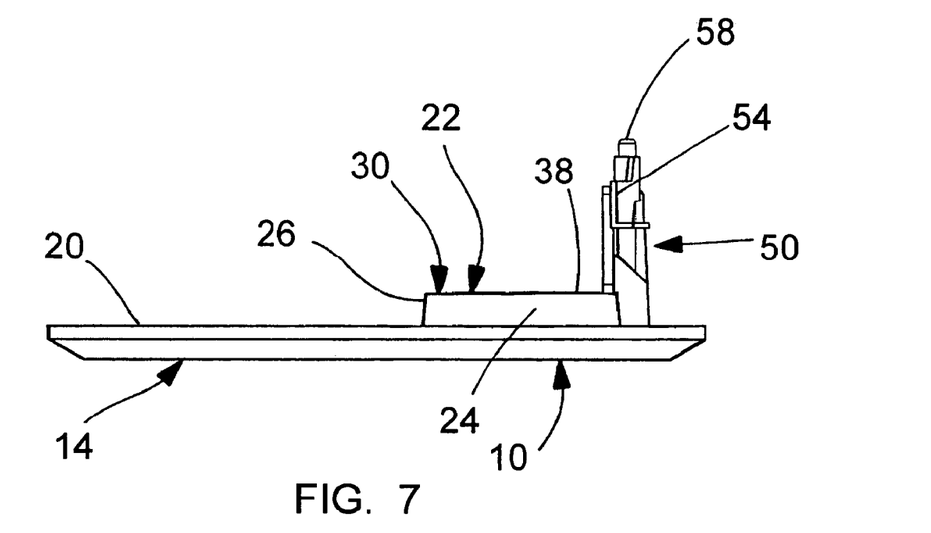
FIG. 7 is a top plan view of the wall plate assembly of FIG. 1.
Figure 8:
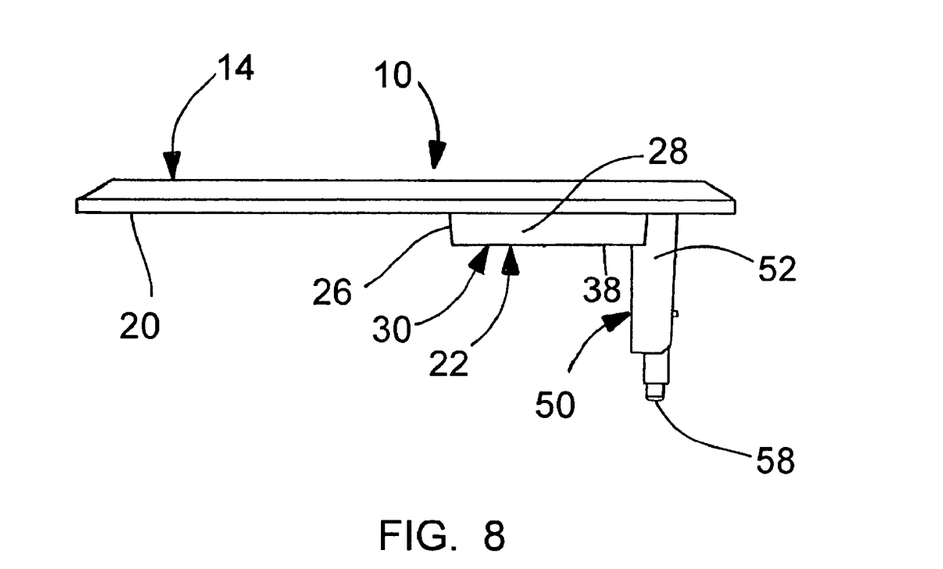
FIG. 8 is a bottom plan view of the wall plate assembly of FIG. 1.
Figure 9:
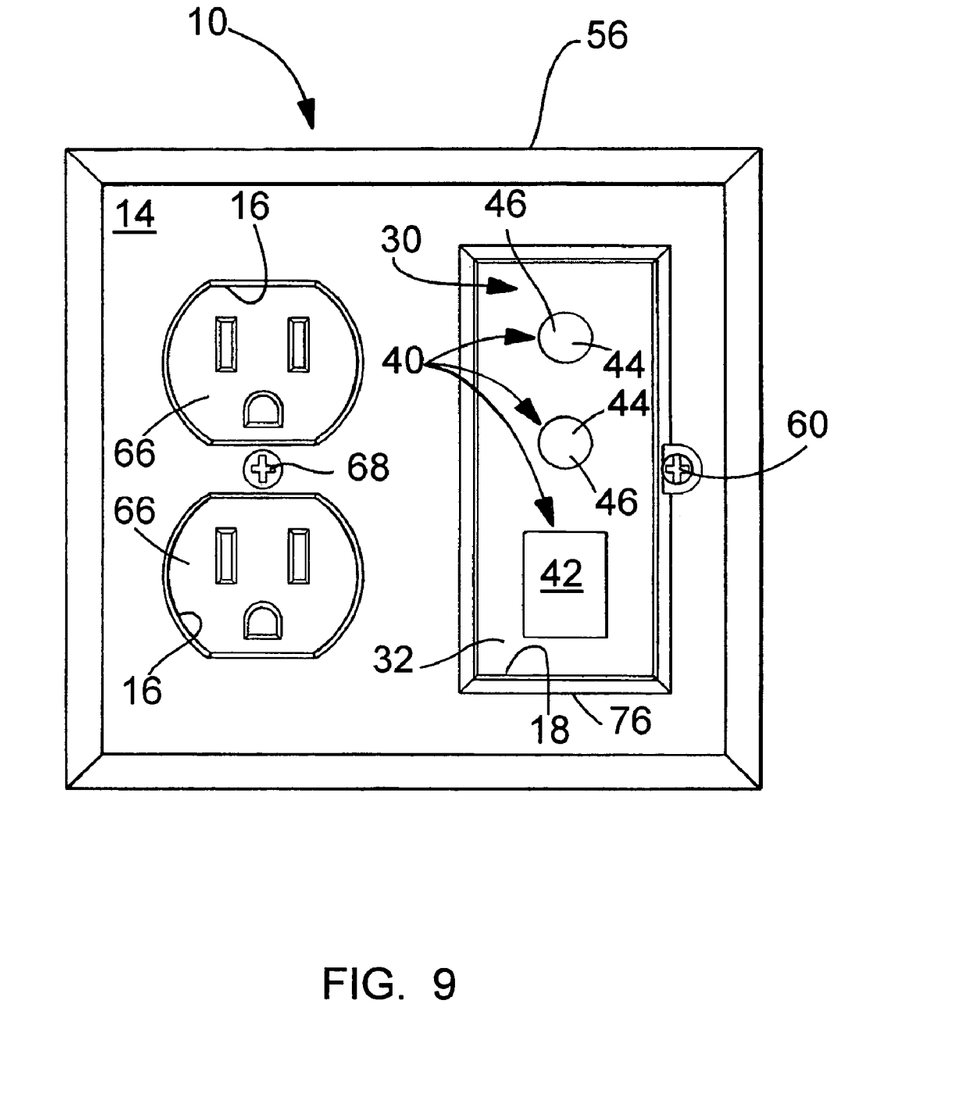
FIG. 9 is a front elevation view of the wall plate assembly of FIG. 1 after assembly of the electrical power outlet thereto and removal of the knockouts from the rear faceplate.

The wall plate assembly 10 includes an front faceplate 14 which has a pair of first lateral openings 16, each of which has a pair of opposing straight sides and a pair of opposing outwardly curved sides, as shown in FIGS. 3 and 4. The front faceplate 14 has a second lateral opening 18 and a rear surface 20. The front faceplate 14 is planar and has an outer edge which may be beveled.

A flange structure 22 is fixed to the rear surface 20 and has a top flange 24, a pair of side flanges 26, and a bottom flange 28 which are fixed to one another such that each of the side flanges is between the top and bottom flanges in perpendicular relation thereto. This results in the flange structure 22 having a vertical cross-section which is rectangular.

The wall plate assembly 10 includes a rear faceplate 30 having a front surface 32 which is fixed to the rear edges of the flange structure 22 such that the rear faceplate 30 is recessed from the front faceplate 14. The rear faceplate 30 is planar and parallel to the front faceplate. Access to the rear faceplate 30 is provided through the second lateral opening 18.

The rear faceplate 30 has knockouts 34. The outer peripheries of the front ends of the knockouts 34 are indented in the rearward direction to form grooves 36 as shown in FIG. 3. The grooves 36 may be indented by a dimension, such as 50 mils. The rear ends of the knockouts 34 do not extend to the rear surface 38 of the rear faceplate 30 resulting in the knockouts being recessed in the forward direction, as shown in FIG. 4. These recesses of the knockouts 34 may be by a dimension, such as 50 mils. The knockouts 34 are removed to provide low voltage ports 40 in the rear faceplate 30. The low voltage ports 40 provide openings in which receptacles, such as telephone jacks or plugs for electrical cables, may be supported. Such cables may be for telephone, cable television, personal computers, data transmissions or digital communications. The low voltage ports 40 may be referred to as data ports.

Figure 10:
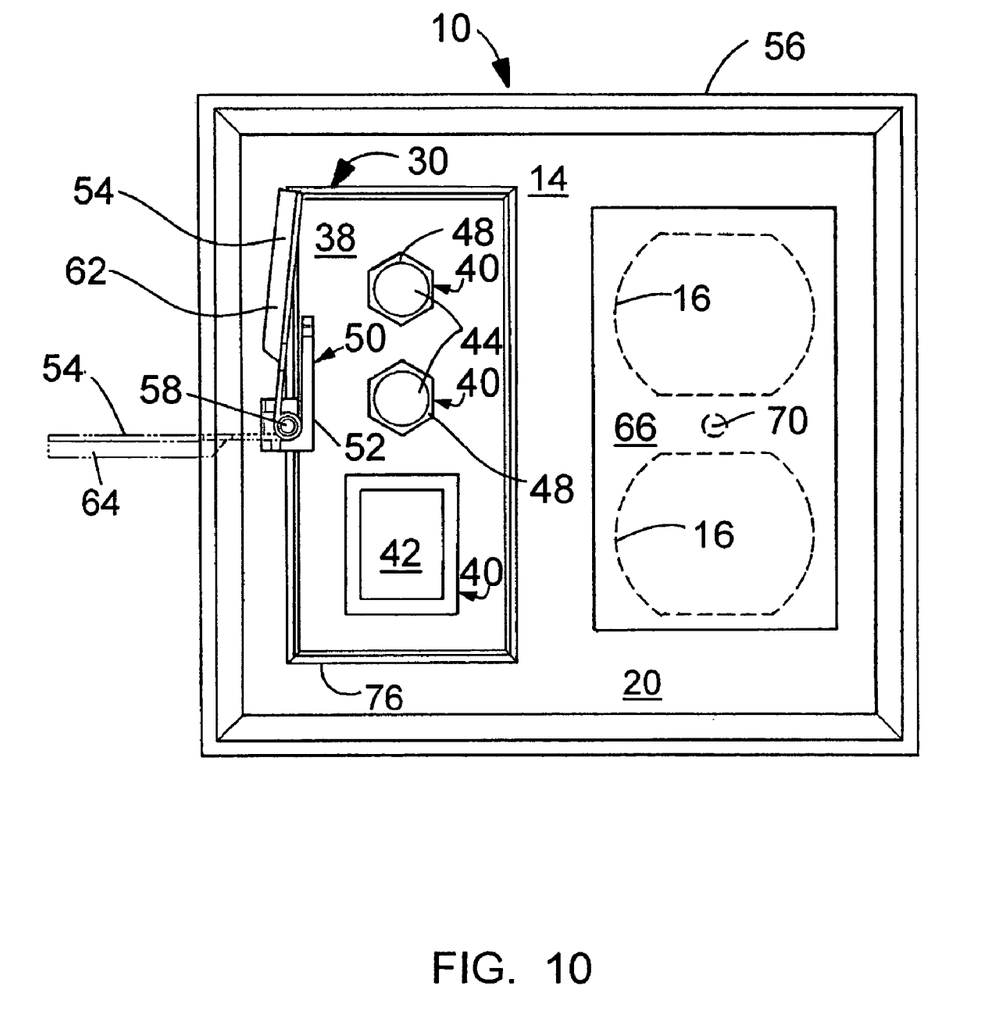
FIG. 10 is a rear elevation view of the wall plate assembly of FIG. 9 showing the arm in the retracted position, in solid lines, and secured position, in phantom.

The cross-sections of the low voltage ports 40 may vary in shape to be compatible with the connectors to be supported therein. For example, as shown FIG. 9, the low voltage ports 40 may include a rectangular low voltage port 42 which has a rectangular cross-section. The low voltage ports 40 may further include circular/hexagonal low voltage ports 44 each of which has a forward end 46 which intersects the front surface 32 of the rear faceplate 30. Each forward end 46 has a circular cross-section. The circular/hexagonal low voltage ports 44 each have a rear end 48 which is recessed from the rear surface 38 of the rear faceplate 30. Each recess has a hexagonal cross-section, as shown in FIG. 10.

Additionally, the low voltage ports 40 may vary in number and in configuration on the rear faceplate 30. For example, alternative embodiments of the rear faceplate 30 may have more than one rectangular low voltage port 42 and fewer or more than two of the circular/hexagonal low voltage ports 44. Also, alternative embodiments of the rear faceplate 30 may have one or more circular/hexagonal low voltage ports 44 without having any rectangular low voltage ports 42, or may have one or more rectangular low voltage ports without having any circular/hexagonal low voltage ports.

The wall plate assembly 10 includes a clamp 50 which has an elongate flange 52 and an arm 54 pivotally connected to the flange in perpendicular relation thereto when installed. The flange 52 is connected to the rear surfaces 20 or 38 of the front and rear faceplates 14, 30 and to the side flange 26 which is adjacent to the outer periphery 56 of the front faceplate. The arm 54 is coupled to an elongate member, such as a pin 58, which extends through the flange 52. The forward end of the pin 58 has a head 60 to which may be coupled a tool for rotating the pin. Such coupling may be provided, for example, by forming in the front surface of the head 60 a recess which may be engaged by a screw driver. Rotation of the pin 58, such as by a screw driver, causes pivoting of the arm 54 about the flange 52. The arm 54 may thereby be swung between a retracted position 62 in which the arm is within the outer periphery 56 of the front faceplate 14 and a secured position 64 in which the arm extends beyond the outer periphery.

The wall plate assembly 10 is prepared for mounting to the wall structure 12 by removing the knockouts 34, such as by applying a force thereto which is sufficient to fracture the knockouts from the rear faceplate 30. Such fracturing will occur along the grooves 36 resulting in the cross-sections of the low voltage ports 40 having the specific shapes shown in FIGS. 9 and 10. Alternatively, the knockouts 34 may be removed by cutting the sections which retain the knockouts to the rear faceplate 30. The knockouts 34 which are removed by such cutting may be referred to as cutouts.

The preparation of the wall plate assembly 10 for mounting to the wall structure 12 further includes assembling an electrical power outlet 66 to the wall plate assembly. Such assembly may be either before or after the removal of the knockouts 34 from the rear faceplate 30.

An electrical power outlet 66 is assembled to the wall plate assembly 10 by placing the front surface of the outlet against the rear surface 20 of the front faceplate 14 such that the receptacles for the prongs of a plug are accessible through the first lateral openings 16. The electrical power outlet 66 has a central bore the inner surface of which is threaded. The electrical power outlet 66 is secured to the front faceplate 14 by an elongate screw 68 which extends through an opening 70 in the front faceplate between the first lateral openings 16 and into threaded engagement with the central bore of the electrical power outlet 66. Tightening the screw 68 results in drawing the electrical power outlet 66 into engagement with the rear surface 20 of the front faceplate 14 to secure the electrical power outlet thereto.

Figure 11:
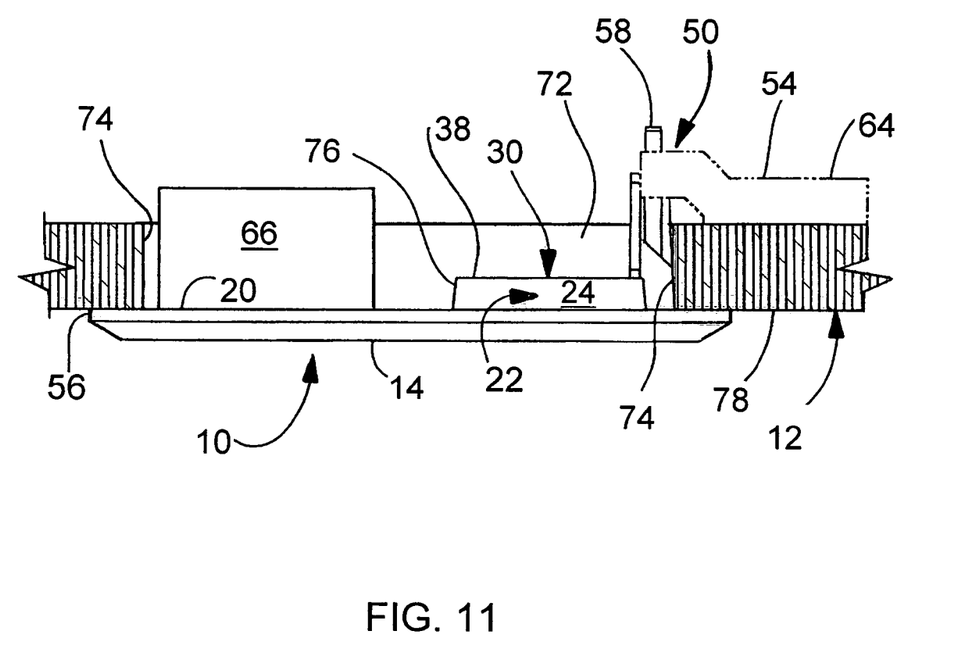
FIG. 11 is a top plan view of the wall plate assembly of FIG. 9 showing the arm in the secured position, in phantom, and the wall plate assembly secured to a wall structure.

The wall plate assembly 10 is mounted to the wall structure 12 initially by orienting the assembly such that the front and rear faceplates 14, 30 are vertical and the rear surfaces 20, 38 thereof face the opening 72 in the wall structure 12. The outer periphery 56 of the front faceplate 14 extends beyond the periphery 74 of the opening 72 in the wall structure 12. The electrical power outlet 66 and the outer periphery 76 of the rear faceplate 30 are within the periphery 74 which allows the insertion of the rear faceplate 30 and electrical power outlet 66 through the opening 72. Before such insertion, the arm 54 is swung to the retracted position 62 by rotating the pin 58, such as by engaging the head 60 with a screw driver. When the arm 54 is in the retracted position 62, the arm does not obstruct insertion of the rear faceplate 30 and power outlet 66 through the opening 72 in the wall structure 12. Accordingly, with the arm 54 in the retracted position 62, the electrical power outlet 66 and rear faceplate 30 are inserted through the opening 72 in the wall structure 12, as shown in FIG. 11.

The relative sizes of the peripheries 56, 74 of the front faceplate 14 and opening 72 result in the rear surface 20 of the front faceplate squarely contacting the outer surface 78 of the wall structure 12 adjacent to the opening 72. The longitudinal position of the arm 54 on the flange 52 results in the arm being to the rear of and adjacent to the wall structure 12 when the rear surface 20 of the front faceplate 14 squarely contacts the outer surface 78. This relative positioning of the arm 54 and the wall structure 12 allows the arm to be swung to the secured position 64 when the front faceplate 14 squarely contacts the outer surface 78, as shown in FIG. 11.

Following insertion of the electrical power outlet 66 and rear faceplate 30 into the opening 72 in the wall structure 12 such that the rear surface 20 of the front faceplate 14 squarely contacts the outer surface 78, the arm 54 is swung to the secured position 64 by rotating the pin 58, such as by engaging the head 60 with a screw driver. Moving the arm 54 to the secured position 64 results in the wall structure 12 being secured between the arm and the front faceplate 14, as shown in FIG. 11. This securing obstructs forward retraction of the rear faceplate 30 and power outlet 66 through the opening 72 in the wall structure 12.

The securing of the front faceplate 14 against the outer surface 78 results in the flange structure 22 being within the opening 72. As a result, when a cable plug is secured to a connector supported in the low voltage port 40, the cable plug is recessed from the outer surface 78. The entire cable plug or a portion thereof will be recessed from the outer surface 78.

The wall plate assembly 10 may be released and retracted from the opening 72 in the wall structure 12 by swinging the arm 54 to the retracted position 62 by rotating the pin 58, such as by engaging the head 60 with a screw driver. The arm 54, when in the retracted position 62, does not obstruct forward retraction of the rear faceplate 30 and electrical power outlet 66 through the opening 72 in the wall structure 12.

Figure 12:
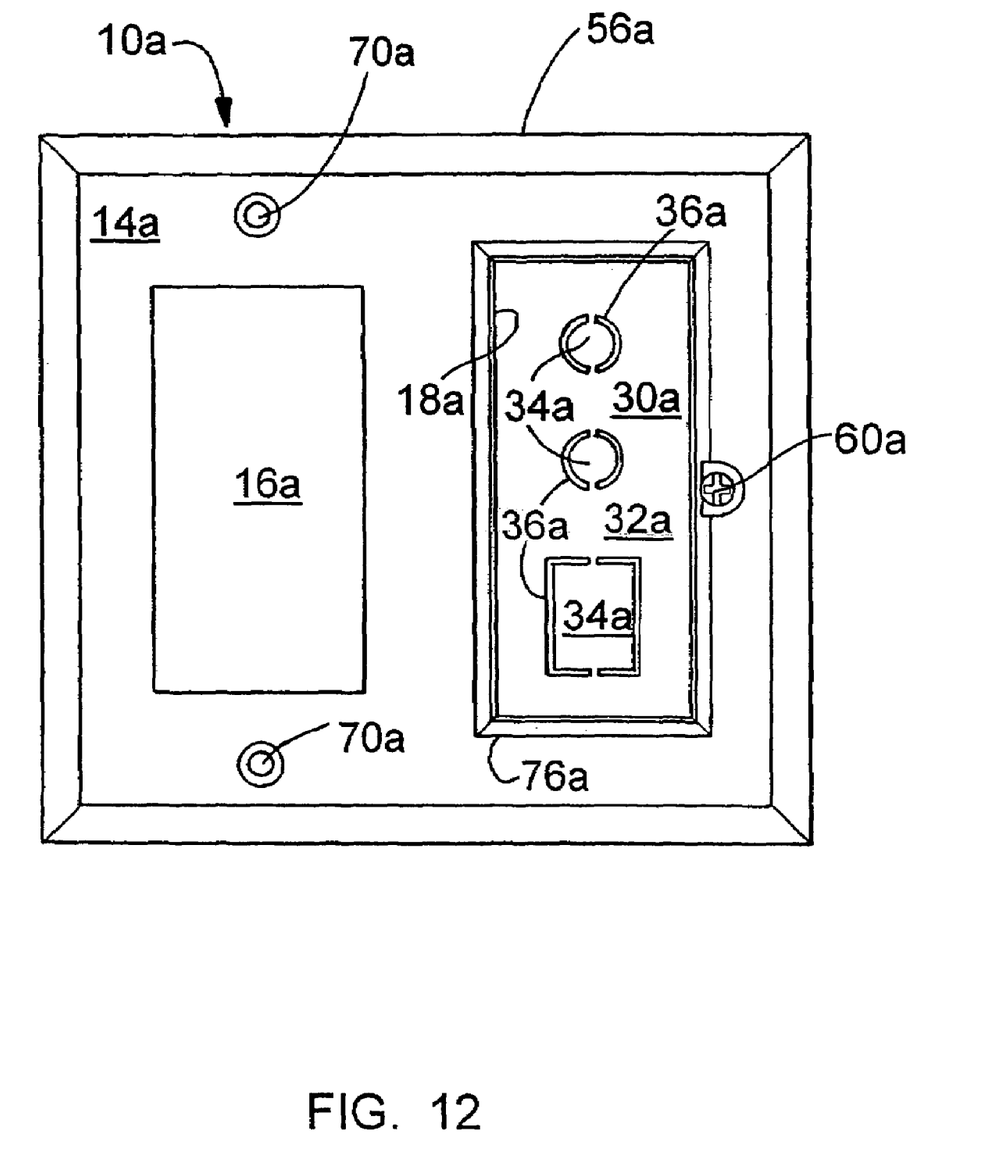
FIG. 12 is a front elevation view of an alternative second embodiment of the wall plate assembly of FIG. 1 before assembly of the electrical power outlet thereto and removal of the knockouts from the rear faceplate, the outlet box assembly having an alternative configuration of the first lateral opening.
Figure 13:
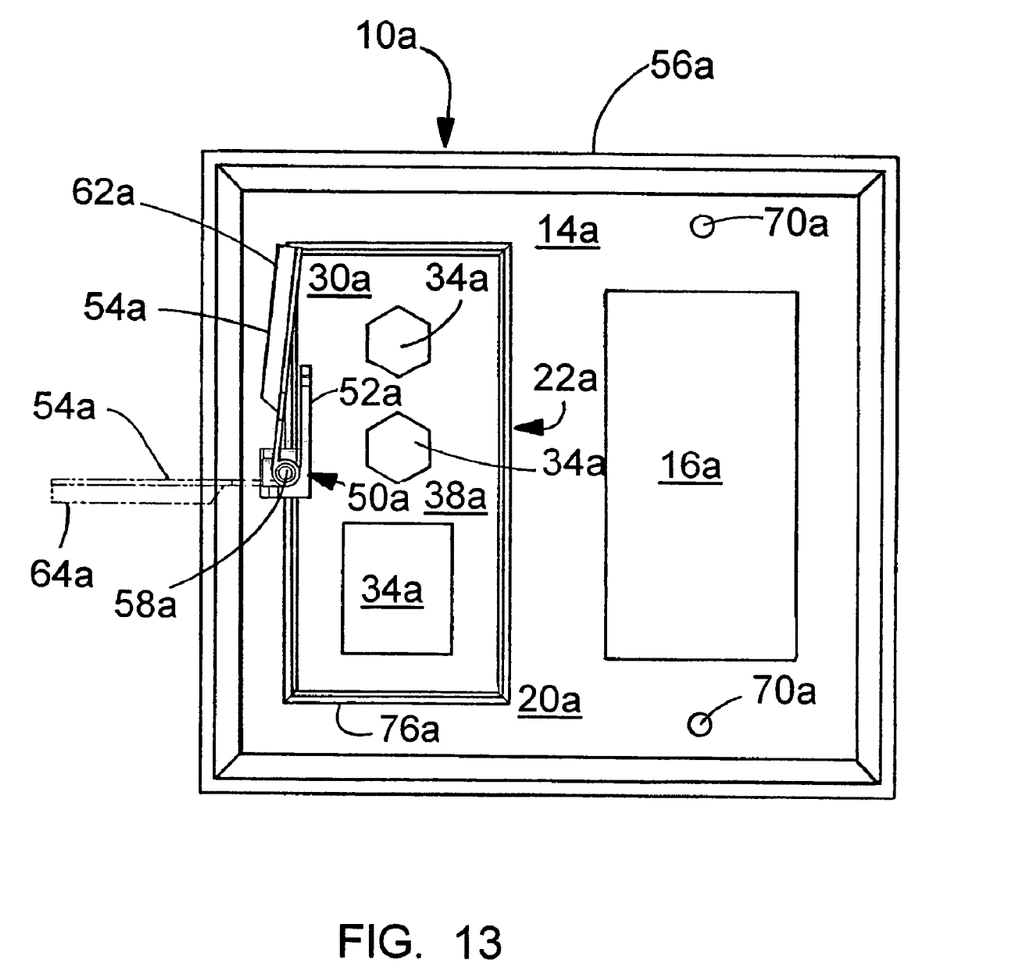
FIG. 13 is a rear elevation view of the wall plate assembly of FIG. 12 showing the arms in the retracted and secured positions.

An alternative embodiment of the wall plate assembly 10a is shown in FIGS. 12 and 13. Parts illustrated in FIGS. 12 and 13 which correspond to parts illustrated in FIGS. 1 to 11 have the same reference numeral as in FIGS. 1 to 11 with the addition of the suffix "a" in FIGS. 12 and 13. The front faceplate 14a has a single first lateral opening 16a which is rectangular as shown in FIGS. 12 and 13. The front faceplate 14a has a pair of openings 70a located above and below the first lateral opening 16a. Respective screws extend through the openings 70a into threaded engagement with corresponding threaded bores in an electrical power outlet for securing the power outlet to the front faceplate 14a.

The entire disclosure of the U.S. Design Patent Application filed in the USPTO on even date herewith and entitled "Wall Plate Assembly", having as the inventor Cong Thanh Dinh, and identified by the Attorney Docket No. 577-670 DES is hereby incorporated by reference herein.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A wall plate assembly comprising:

a front faceplate having two lateral openings;

a rear faceplate connected to said front faceplate such that said rear faceplate is recessed from said front faceplate and access to said rear faceplate is provided through one of said lateral openings, said rear faceplate having a low voltage port, wherein said low voltage port has a forward end which intersects with a forward surface of said rear faceplate, said forward end having a circular cross-section, said low voltage port having a rear end which intersects with a rear surface of said rear faceplate, said rear end having a hexagonal cross-section; and a clamp connected to a rear surface of said front or rear faceplates for securing said front faceplate to a wall structure.

2. A wall plate assembly comprising:

a front faceplate having two lateral openings;

a rear faceplate connected to said front faceplate such that said rear faceplate is recessed from said front faceplate and access to said rear faceplate is provided through one of said lateral openings, said rear faceplate having a low voltage port; and a clamp connected to a rear surface of said front or rear faceplates for securing said front faceplate to a wall structure, wherein said front faceplate has an outer periphery, said clamp having an arm which may be swung between a retracted position in which said arm is within said outer periphery and a secured position in which said arm extends beyond said outer periphery such that said arm does not obstruct insertion and retraction of said rear faceplate through an opening in the wall structure when said arm is in said retracted position, said arm obstructing retraction of said rear faceplate through the opening in the wall structure when said arm is in said secured position and the wall structure is secured between said arm and front faceplate.

* * * * *